(12) United States Patent
Su et al.

(10) Patent No.: US 9,074,135 B2
(45) Date of Patent: Jul. 7, 2015

(54) LIQUID CRYSTAL COMPOSITION FOR LC LENS AND 3D DISPLAY CONTAINING THE SAME

(71) Applicant: CHUNGHWA PICTURE TUBES, LTD., Taoyuan (TW)

(72) Inventors: Chun-Wei Su, New Taipei (TW); Jan-Tien Lien, Keelung (TW)

(73) Assignee: CHUNGHWA PICTURE TUBES, LTD., Taoyuan (TW)

( * ) Notice: Subject to any disclaimer, the term of this patent is extended or adjusted under 35 U.S.C. 154(b) by 148 days.

(21) Appl. No.: 13/717,704

(22) Filed: Dec. 18, 2012

(65) Prior Publication Data

US 2014/0049707 A1  Feb. 20, 2014

(30) Foreign Application Priority Data

Aug. 15, 2012  (TW) .............. 101129562 A

(51) Int. Cl.

| | |
|---|---|
| *C09K 19/54* | (2006.01) |
| *C09K 19/58* | (2006.01) |
| *G02F 1/13* | (2006.01) |
| *G02B 27/22* | (2006.01) |
| *C09K 19/12* | (2006.01) |
| *C09K 19/16* | (2006.01) |
| *C09K 19/18* | (2006.01) |
| *C09K 19/20* | (2006.01) |
| *C09K 19/24* | (2006.01) |

(52) U.S. Cl.
CPC .............. *C09K 19/54* (2013.01); *G02F 1/1313* (2013.01); *G02B 27/22* (2013.01); *C09K 19/126* (2013.01); *C09K 19/16* (2013.01); *C09K 19/18* (2013.01); *C09K 19/2007* (2013.01); *C09K 19/2021* (2013.01); *C09K 19/24* (2013.01); *C09K 19/586* (2013.01); *C09K 2019/168* (2013.01); *C09K 2019/188* (2013.01); *C09K 2019/2078* (2013.01)

(58) Field of Classification Search
None
See application file for complete search history.

(56) References Cited

U.S. PATENT DOCUMENTS 4,399,298  A  *  8/1983  Sugimori et al. ............... 560/59
5,156,763  A  *  10/1992  Gray et al. ............... 252/299.67

(Continued)

FOREIGN PATENT DOCUMENTS

| CN | 101712874 A | 5/2010 |
|---|---|---|
| TW | M388658 | 9/2010 |
| TW | 201042284 | 12/2010 |

*Primary Examiner* — Cynthia H Kelly
*Assistant Examiner* — Anna Malloy
(74) *Attorney, Agent, or Firm* — CKC & Partners Co., Ltd.

(57) ABSTRACT

A liquid crystal composition for liquid crystal lens and a stereoscopic (3D) display containing the same are provided. The liquid crystal composition includes a main liquid crystal (chemical formula I), a first optical modifier (R811 or S811), a second optical modifier (CB15), and a dielectric constant modifier (chemical formula IV). The 3D display utilizes a horizontal electric field to make the above liquid crystal composition form crystal lens.

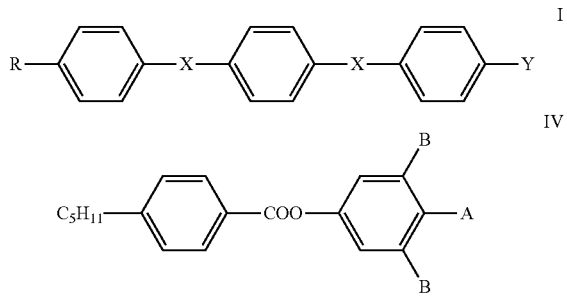

9 Claims, 1 Drawing Sheet

(56) References Cited

U.S. PATENT DOCUMENTS

| | | | |
|---|---|---|---|
| 6,151,093 A * | 11/2000 | Takiguchi et al. | 349/172 |
| 6,338,883 B1 * | 1/2002 | Iwamatsu et al. | 428/1.1 |
| 7,969,517 B2 | 6/2011 | Jung | |
| 2002/0015132 A1 * | 2/2002 | Kobayashi et al. | 349/186 |
| 2011/0157497 A1 | 6/2011 | Kim | |
| 2013/0321753 A1 * | 12/2013 | Lu et al. | 349/139 |

\* cited by examiner

LIQUID CRYSTAL COMPOSITION FOR LC LENS AND 3D DISPLAY CONTAINING THE SAME

CROSS-REFERENCE TO RELATED APPLICATION

This application claims the priority benefit of Taiwan application serial no. 101129562, filed Aug. 15, 2012, the full disclosure of which is incorporated herein by reference.

BACKGROUND

1. Technical Field

The disclosure relates to a liquid crystal composition and a stereoscopic (3D) display comprising the liquid crystal composition. More particularly, the disclosure relates to a liquid crystal composition which can form liquid crystal lens by utilizing a horizontal electric field, and a stereoscopic display comprising the liquid crystal composition.

2. Description of Related Art

Conventional stereoscopic displays utilize liquid crystal (LC) lens to generate 3D pictures. Positive electrodes and negative electrodes are respectively disposed on the two substrates sandwiching a liquid crystal layer. Vertical electric fields with various strengths between the two substrates are formed by applying various driving voltages on the positive electrodes and negative electrodes to induce the liquid crystal molecules to form liquid crystal lens with various focal lengths.

SUMMARY

Accordingly, a novel liquid crystal (LC) lens is provided. Horizontal electric field is used to induce an optically isotropic liquid crystal to form liquid crystal lens, which may be used on a stereoscopic display.

First, a liquid crystal (LC) composition for forming liquid crystal lens is provided. The LC composition comprises 100 parts by weight of a main liquid crystal, 50-80 parts by weight of a first optical modifier, 5-20 parts by weight of a second optical modifier, and 5-50 parts by weight of a dielectric constant modifier.

The chemical structure of the main liquid crystal is shown in the chemical formula I below. R is a straight chained $C_nH_{2n+1}$ and n=3-9, X is a rigid linking group, such as C≡C, C=C, COO, or N=N functional group, to prevent free rotation between two adjacent benzene rings, and Y is CN or F.

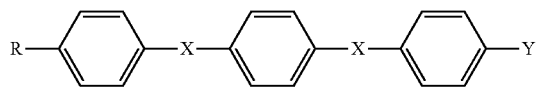

I

The chemical structure of the first optical modifier is shown in the chemical formula II below.

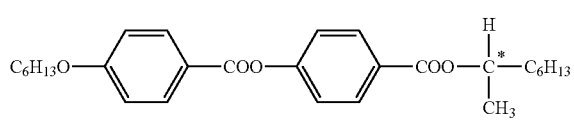

II

The chemical structure of the second optical modifier is shown in the chemical formula III below.

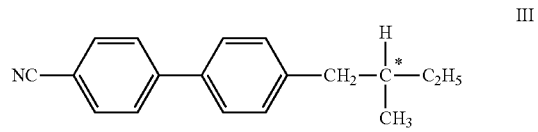

III

The chemical structure of the dielectric constant modifier is shown in the chemical formula IV below. A is F or CN, and B is F or H.

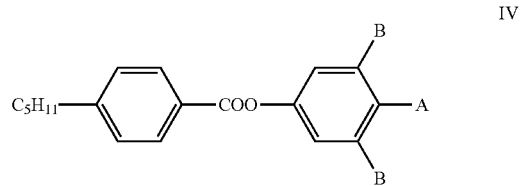

IV

Second, according to an embodiment, a stereoscopic display is provided. The stereoscopic display comprises a first substrate, at least a positive electrode, at least a negative electrode, a liquid crystal layer, and a second substrate. The positive electrode and the negative electrode are located on the inner surface of the first substrate, and separated from each other by a distance to form a horizontal electric field across the distance. The composition of the liquid crystal layer is described as above, and the liquid crystal layer is disposed between the first substrate and the second substrate.

According to another embodiment, another stereoscopic display is provided. The stereoscopic display comprises a first substrate, a negative electrode layer, a dielectric layer, a plurality of positive electrode, a liquid crystal layer, and a second substrate. The negative electrode and the dielectric layer are sequentially disposed on the inner surface of the first substrate. The positive electrodes are disposed on the dielectric layer, and separated from each other by a distance to form a plurality of horizontal electric field across the distance. The composition of the liquid crystal layer is described as above, and disposed between the first substrate and the second substrate.

The foregoing presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later. Many of the attendant features will be more readily appreciated as the same becomes better understood by reference to the following detailed description considered in connection with the accompanying drawings.

DETAILED DESCRIPTION

Figure 1:
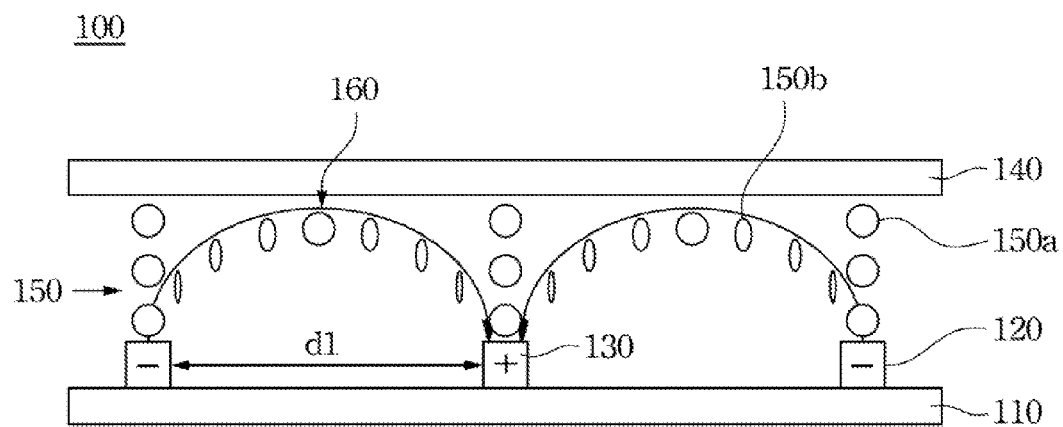
FIG. 1 is a cross-sectional diagram of a stereoscopic display according to an embodiment of this invention.

Accordingly, a liquid crystal (LC) composition for LC lens and a stereoscopic (3D) display containing the LC composition are provided. The focal lengths of the LC lens can be adjusted by adjusting the driving voltage for forming the LC lens. 2D or 3D images displayed by the 3D display also can be controlled by turning off or turning on the driving voltage of the LC lens. In the following detailed description, the exemplary LC composition and the exemplary structure of the 3D display will be introduced.

For purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Liquid Crystal Composition

According to an embodiment, a liquid crystal (LC) composition for forming liquid crystal lens is provided. The LC composition comprises 100 parts by weight of a main liquid crystal, 50-80 parts by weight of a first optical modifier, 5-20 parts by weight of a second optical modifier, and 5-50 parts by weight of a dielectric constant modifier.

The chemical structure of the main liquid crystal, which belongs to nematic LC, is shown in the chemical formula I below. R is a straight chained $C_nH_{2n+1}$ and n=3-9, X is a rigid linking group to prevent free rotation between two adjacent benzene rings, and Y is CN or F. The above rigid linking group X is —C═C—, —C≡C—, —COO—, or —N═N— functional group.

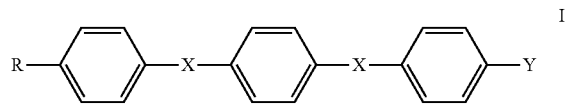

I

Generally speaking, nematic LC molecules are long rod-like molecules, and thus each LC molecule has a long molecular axis and a short molecular axis. When the nematic LC molecules are arranged, the long molecular axes may align in parallel, but the short molecular axes permute in random directions. Since nematic LC molecules can regularly align in only one direction, the intermolecular interaction is the weakest among all kinds of LC molecules, and thus the nematic LC molecules flow most easily. A nematic LC molecule usually has a core structure of "aromatic ring-linking group-aromatic ring." If the number of the linked aromatic rings is larger, the birefringence ($\Delta n=n_1-n_2$) is larger.

The chemical structure of the first optical modifier is shown in the chemical formula II below. The first optical modifier is a chiral molecule with optical activity, such as R811 molecule or S811 molecule provided by Merck.

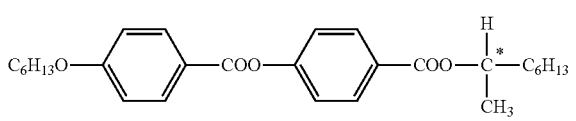

II

When chiral molecules dissolved in a nematic LC, the molecular arrangement of the LC mixture is usually similar to the molecular arrangement of a cholesteric LC. However, since the first optical modifier is solid at room temperature, the viscosity of the mixture is usually too large to be applied in LC displays. Therefore, a second optical modifier in liquid state at room temperature is needed to be added into the LC mixture.

The chemical structure of the second optical modifier in liquid state is shown in the chemical formula III below, the commercial name of this molecule is CB15. From the chemical formula III, it can be known that the second optical modifier is also a chiral molecule with optical activity. While increasing the added amount of the second optical modifier, the LC molecular arrangement is gradually changed from cholesteric LC's arrangement to double helix arrangement, and finally to spherical arrangement. Meanwhile, the viscosity of the mixture is also gradually decreased. When the molecular arrangement of the LC mixture is spherical, the LC mixture is optically isotropic. That is, the birefringence of the LC mixture is zero.

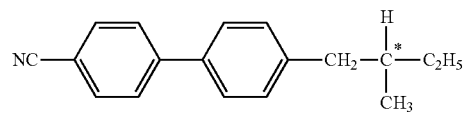

However, the way of changing the molecular arrangement of optically isotropic LC molecules is different from other optically anisotropic LC molecules. The molecular arrangement of optically anisotropic LC molecules can be changed by changing the direction of electric field to induce the formation of LC lens. However, the molecular arrangement of the optically isotropic LC molecules cannot be changed by changing the direction of the electric field. For optically isotropic LC molecules, it is the refraction index in the direction of the electric field changed by an applied electric field, which induce birefringence in the optically isotropic LC. This phenomenon is called Kerr effect. The value of Kerr constant is used to measure the Kerr effect. Changing Kerr constant of an optically isotropic LC needs large driving voltage, and thus a dielectric constant modifier is needed to be added into the optically isotropic LC mixture to increase the final dielectric constant of the final LC mixture to effectively decrease the needed driving voltage.

The chemical structure of the dielectric constant modifier above is shown in chemical formula IV below. A is F or CN, and B is F or H. After adding the dielectric constant modifier, the final dielectric constant of the final LC mixture can be greatly increased to effectively decrease the driving voltage needed by forming LC lens.

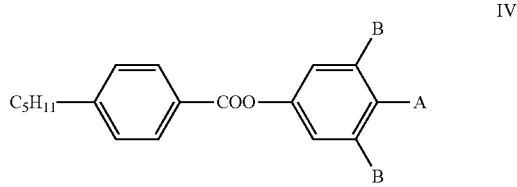

IV

For example, when A is CN and B is F, the dielectric constant of the dielectric constant modifier is about 69. The driving voltage of the optically isotropic LC without adding the dielectric constant for forming LC lens was about 60-70 V. However, when the focal lengths are the same and after adding 10 parts by weight of the dielectric constant modifier, the driving voltage for forming LC lens could be decreased to 30-40 V.

Stereoscopic (3D) Display

FIG. 1 is a cross-sectional diagram of a stereoscopic display according to an embodiment of this invention. In FIG. 1, the stereoscopic (3D) display 100 comprises a first substrate 110, at least a positive electrode 130, at least a negative electrode 120, a liquid crystal layer 150, and a second substrate 140.

The positive electrode 130 and the negative electrode 120 are located on the inner surface of the first substrate 110, and separated from each other by a distance d1 to form a horizontal electric field 160 across the distance d1. The composition of the liquid crystal layer 150 is described as above, and the liquid crystal layer 150 is disposed between the first substrate 110 and the second substrate 140. No other electrodes are disposed on the second substrate 140.

The field strength distribution of the horizontal electric field 160 across the positive electrode 130 and the negative electrode 120 is parabolic distribution. The field strength of the horizontal electric field 160 near the positive electrode 130 and the negative electrode 120 is strongest, and the field strength of the horizontal electric field 160 in the central between the positive electrode 130 and the negative electrode 120 is weakest. Therefore, the LC molecular clusters 150b located between the positive electrode 130 and the negative electrode 120, and arranged spherically in the beginning, will be extruded by various field strengths at various locations. Therefore, the arrangement of the LC molecular clusters 150b becomes rod-like with various widths. Then, the LC molecular clusters 150b are induced to generate birefringence and form LC lens. However, the LC molecular clusters 150a above the positive electrode 130 and the negative electrode 120 are still arranged spherically, since no horizontal electric field 160 presents above the positive electrode 130 and the negative electrode 120.

Therefore, when the positive electrode 130 and the negative electrode 120 are turned on, a horizontal electric field 160 can be generated to induce forming LC lens in the LC layer 150. Thus, the 3D display 100 can display 3D images viewable by naked eyes. When the positive electrode 130 and the negative electrode 120 are turned off, the LC layer 150 reverts to optically isotropic. Then, the 3D display 100 can display 2D images.

Furthermore, the curvature of the horizontal field 160 can be changed by the voltage applied on the positive electrode 130 and the negative electrode 120 to control the focal length of the LC lens. Therefore, the number of view angles and 3D display's resolution can be changed by applying various strengths of voltage to the positive electrode 130 and the negative electrode 120. Generally speaking, the resolution is better when the number of the view angles is less. On the contrary, the resolution is poorer when the number of the view angles is more.

Figure 2:
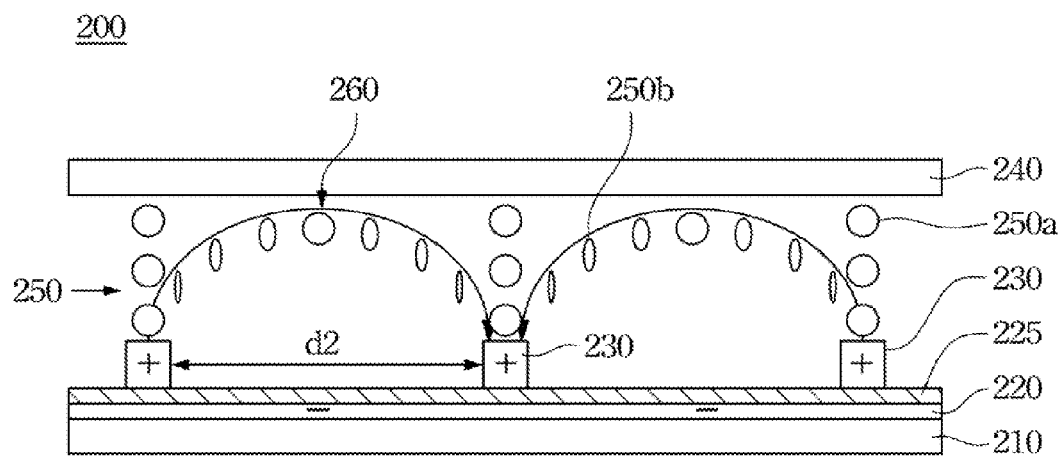
FIG. 2 is a cross-sectional diagram of another stereoscopic display according to another embodiment of this invention.

FIG. 2 is a cross-sectional diagram of another stereoscopic display according to another embodiment of this invention. In FIG. 2, the stereoscopic display 200 comprises a first substrate 210, a negative electrode layer 220, a dielectric layer 225, a plurality of positive electrode 230, a liquid crystal layer 250, and a second substrate 240.

The negative electrode 220 and the dielectric layer 225 are sequentially disposed on the inner surface of the first substrate 210. The positive electrodes 230 are disposed on the dielectric layer 225, and separated from each other by a distance d2. After turning on, the positive electrodes 230 and the negative electrode layer 220 can form horizontal electric fields 260 across these distance d2. The composition of the liquid crystal layer 250 is described as above, and the liquid crystal layer 250 is disposed between the first substrate 210 and the second substrate 240. No other electrodes are disposed on the second substrate 240.

In FIG. 2, since the effect of the horizontal electric field 260 is similar to the effect of the horizontal electric field 160 in FIG. 1, the interaction between the horizontal electric field 260 and the LC molecular clusters 250b, and the effect of the interaction to the displayed images by the 3D display 200 are thus omitted here.

According to the embodiments of this invention above, it can be know that the displayed images can be switched between 3D and 2D by utilizing the interaction between optically isotropic LC molecules and a horizontal electric field. Moreover, the focal length of the induced LC lens can also be changed to change the number of view angles and resolution of 3D images.

All the features disclosed in this specification (including any accompanying claims, abstract, and drawings) may be replaced by alternative features serving the same, equivalent or similar purpose, unless expressly stated otherwise. Thus, each feature disclosed is one example only of a generic series of equivalent or similar features.

What is claimed is:

1. An optically isotropic liquid crystal composition, the liquid crystal composition comprising:

100 parts by weight of a main liquid crystal having a chemical structure shown in a chemical formula I below, wherein R is a straight chained $C_nH_{2n+1}$ and n=3-9, X is a rigid linking group to prevent free rotation between two adjacent benzene rings, and Y is CN or F;

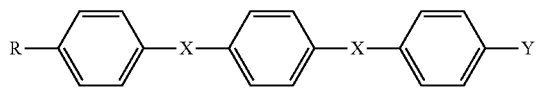

50-80 parts by weight of a first optical modifier having a chemical structure shown in a chemical formula II below;

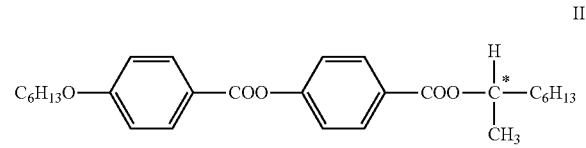

5-20 parts by weight of a second optical modifier having a chemical structure shown in a chemical formula III below; and

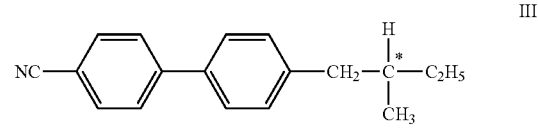

5-50 parts by weight of a dielectric constant modifier having a chemical structure shown in a chemical formula IV below, wherein A is F or CN, and B is F or H.

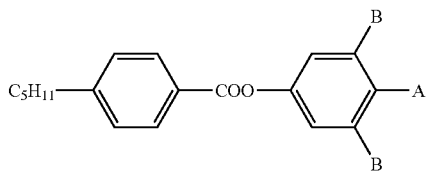

IV

2. The optically isotropic liquid crystal composition of claim 1, wherein the rigid linking group X is C=C, C≡C, COO, or N=N functional group.

3. The optically isotropic liquid crystal composition of claim 1, wherein the A is CN, and B is F in the chemical formula IV.

4. A stereoscopic display, comprising:
a first substrate having a surface;
at least a positive electrode located on the surface of the first substrate;
at least a negative electrode located on the surface of the first substrate and separated from the positive electrode by a distance to form a horizontal electric field across the positive electrode and the negative electrode;
a liquid crystal layer disposed on the surface of the first substrate, the liquid crystal layer is made from the optically isotropic liquid crystal composition of claim 1; and
a second substrate disposed on the liquid crystal layer and having no electrodes disposed thereon.

5. The stereoscopic display of claim 4, wherein the rigid linking group X is C=C, C≡C, COO, or N=N functional group.

6. The stereoscopic display of claim 4, wherein the A is CN, and B is F in the chemical formula IV.

7. A stereoscopic display, comprising:
a first substrate;
a negative electrode layer disposed on the first substrate;
a dielectric layer disposed on the negative electrode layer;
a plurality of positive electrodes disposed on the dielectric layer and separated from each other by a spacing to create a plurality of horizontal electric field across the plurality of spacing;
a liquid crystal layer disposed on the plurality of the positive eletrodes, the liquid crystal layer is made from the optically isotropic liquid crystal composition of claim 1; and
a second substrate disposed on the liquid crystal layer, and having no electrodes disposed thereon.

8. The stereoscopic display of claim 7, wherein the rigid linking group X is C=C, C≡C, COO, or N=N functional group.

9. The stereoscopic display of claim 7, wherein the A is —CN, and B is —F in the chemical formula IV.

* * * * *